United States Patent [19]

Weber

[11] 4,260,590
[45] Apr. 7, 1981

[54] RECOVERY OF SALTS OF ANTHRAQUINONE DISULFONIC ACID IN THE STRETFORD PROCESS

[75] Inventor: Günter Weber, Linden, Fed. Rep. of Germany

[73] Assignee: Linde Aktiengesellschaft, Hollriegelskreuth, Fed. Rep. of Germany

[21] Appl. No.: 122,798

[22] Filed: Feb. 19, 1980

[30] Foreign Application Priority Data

Feb. 16, 1979 [DE] Fed. Rep. of Germany ....... 2906056

[51] Int. Cl.³ .............................................. B01D 53/34
[52] U.S. Cl. .................................... 423/226; 423/563; 423/566; 423/573 R; 423/428
[58] Field of Search ..................... 423/224, 226, 573.6, 423/428, 573 R, 561, 566; 210/37, 38

[56] References Cited

U.S. PATENT DOCUMENTS

| | | | |
|---|---|---|---|
| 3,887,682 | 6/1975 | Kumata | 423/236 X |
| 3,904,734 | 9/1975 | Gosden et al. | 423/226 |
| 3,941,875 | 3/1976 | Tsuruta et al. | 423/566 X |
| 4,070,445 | 1/1978 | Klunder | 423/566 X |
| 4,098,886 | 7/1978 | Nicklin et al. | 423/226 |

Primary Examiner—Earl C. Thomas
Attorney, Agent, or Firm—Miller & White

[57] ABSTRACT

In the Stretford process wherein hydrogen sulfide, obtained for example, in the catalytic conversion of sulfur compounds, is absorbed into an alkaline solution of the sodium salt of anthraquinone disulfonic acid (ADA) and sodium vanadate and eventually converted to elemental sulfur by a reaction of the sodium vanadate with the hydrogen sulfide, some of the hydrogen sulfide undergoes side reactions and is converted to undesirable by-products, e.g., sodium sulfate and sodium thiosulfate. These by-products were removed in the prior art by burning; however, the expensive salts of ADA were also burned in the process of the prior art. In the present improvement, the sodium salts of ADA are preferentially removed in an adsorption column filled with a macroporous adsorption resin, prior to the combustion stage. The adsorption column can be regenerated either with water or with an aqueous solution of sodium carbonate formed in the combustion stage.

9 Claims, 1 Drawing Figure

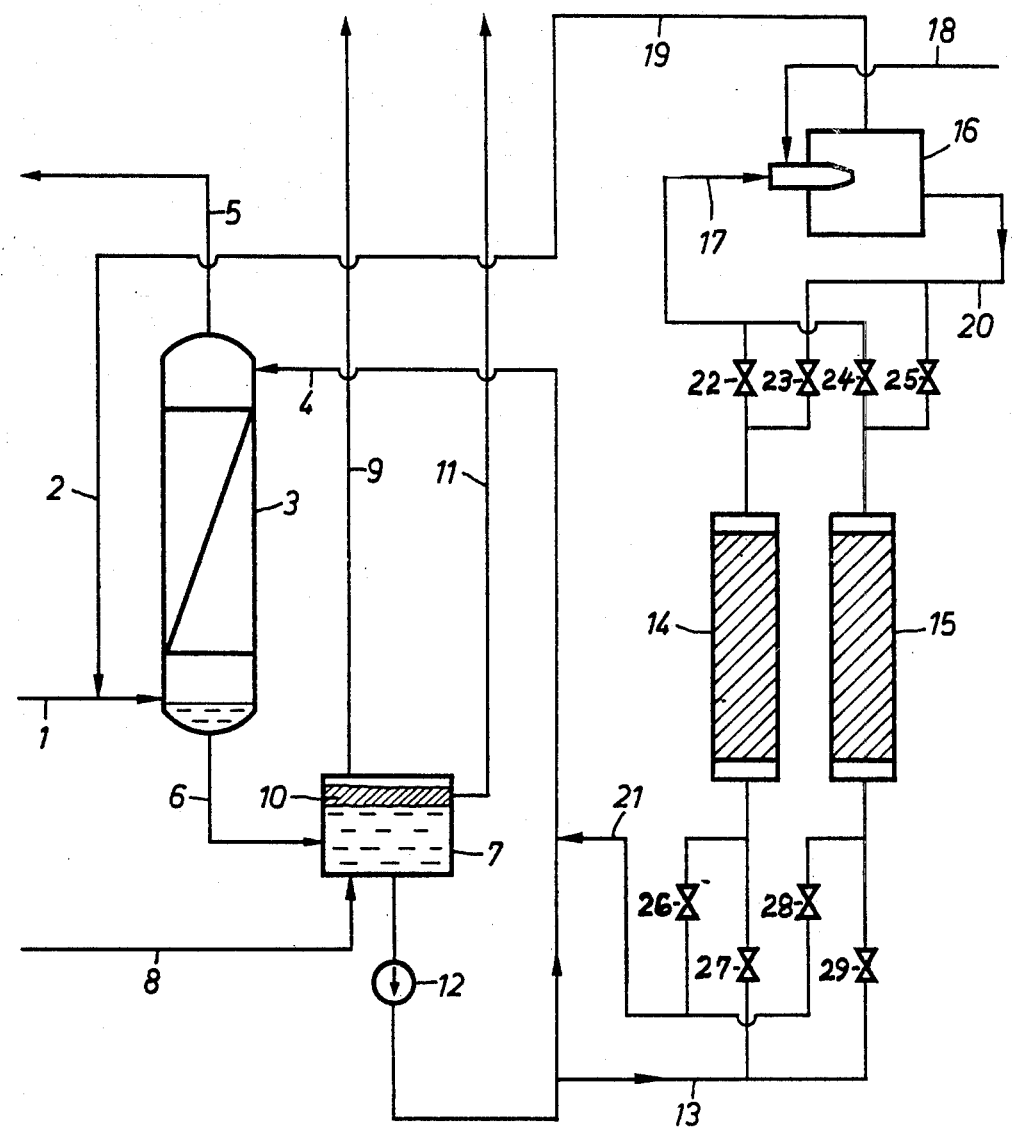

RECOVERY OF SALTS OF ANTHRAQUINONE DISULFONIC ACID IN THE STRETFORD PROCESS

BACKGROUND OF THE INVENTION

This invention relates to the formation of sulfur from hydrogen sulfide, and in particular to the recovery of valuable salts from the Stretford process or the like.

In the so-called Stretford process, an alkaline solution with salts of anthraquinone disulfonic acid (ADA) and a vanadate (+5) is employed as the absorbing liquid (or scrubbing liquid) to absorb hydrogen sulfide from gases or gaseous mixtures containing the hydrogen sulfide. (In this specification and the appended claims, the terms absorber and scrubbing column, and absorbing liquid and scrubbing liquid, respectively, are used interchangeably to designate identical unit operations and process streams, respectively.) The alkaline component is usually sodium carbonate. To accelerate certain partial reactions, sodium vanadate is added in a more modern version of the Stretford process. In the first reaction step, which takes place at a relatively high speed, sodium hydrogen sulfide (sodium bisulfide) is formed in a reaction of hydrogen sulfide with sodium carbonate. Subsequently, elemental sulfur is obtained in a reaction of the sodium hydrogen sulfide with sodium vanadate with a simultaneous reduction of vanadium from +5 to +4 and with the formation of sodium hydroxide solution. The presence of the salt of anthraquinone disulfonic acid is necessary in this process to oxidize the vanadium to its original oxidation state (i.e., +5) with the sodium hydroxide solution. The salt of anthraquinone disulfonic acid, reduced in this process step, is later reoxidized by the addition of oxygen, usually introduced as a stream of air. During this regeneration of the absorbing liquid, elemental sulfur is recovered by flotation during the addition of oxygen (e.g., air blowing).

Aside from producing sulfur in the Stretford process, undesired by-products are formed.

These by-products are sodium thiosulfate and sodium sulfate. A certain percentage of these by-products in the absorbing liquid, which, following the regeneration, is repeatedly recirculated, can be tolerated without adverse effects on the process; however, when a certain limit value is exceeded, corrosion and precipitates occur leading to a troublesome clogging of the apparatus.

To prevent such clogging, it has been proposed [DOS (German Unexamined Laid-Open Application) No. 2,364,267 which is incorporated herein by reference] to continuously branch off a side stream of the absorbing liquid and subject same to a combustion or high-temperature hydrolysis in a non-oxidizing atmosphere. During this step, a solid residue is formed containing the undesirable salts, primarily in the form of sodium sulfate. Gaseous hydrogen sulfide obtained during the hydrolysis is combined with the raw feed gas mixture to be introduced into the hydrogen sulfide absorption stage. The main disadvantage of this prior art process is that the salts of anthraquinone disulfonic acid contained in the side stream of the absorbing liquid are also decomposed during the hydrolysis to form carbon oxides, sodium sulfate, and water. This leads to a continuous destruction of the relatively expensive salts of anthraquinone disulfonic acid.

SUMMARY OF THE INVENTION

Accordingly, a main object of the invention is to provide an improvement in the aforementioned process whereby it is possible to recover the valuable salts of anthraquinone disulfonic acid in a simple and economical way.

An additional object of the invention is to integrate the novel features of the process and the products obtained therefrom into the remaining steps of the process.

Additional objects and advantages will become readily apparent to those skilled in the art from the study of the specification and the appended claims.

These objects are attained by passing the side stream, prior to its introduction into an optional combustion or hydrolysis stage, through an adsorption column packed with a macroporous resin to selectively remove the salts of anthraquinone disulfonic acid from the side stream.

As the salt of the ADA, preferably the disodium salt of anthraquinone, 2,7-disulfonic acid is used, but it is also possible to use other salts, e.g. in general all soluble salts of anthraquinone disulfonic acid, especially the alkali metal salt 1,5-, 1,8-, 2,6-, and 2,7-isomers or mixtures thereof. Thus, whenever the term "salts of anthraquinone disulfonic acid" is used in this specification and the claims, it includes all of the aforementioned salts of anthraquinone disulfonic acids.

The macroporous adsorption resins used in the invention can be chosen from a number of resins, including, but not limited to, those on a polystyrene, polymethylacrylate or polymethylmethacrylate basis the space structure of which may be linked for example by means of divenylbenzene. Their average pore diameter is 10 to 500, preferably 15 to 50 angstroms and their internal surface area is 100 to 1000, preferably 300 to 700 $m^2/g$. Such resins are generally known in the art and are for example produced by the Bayer AG, Leverkusen, Germany, under the name of Lewatit.

The retention of the salts of anthraquinone disulfonic acid is due to the macroporous structure of the adsorbent resins used in this invention. Any ionic, i.e. ion-exchange-active groups, apparently do not play any part in the selective adsorption step as otherwise the sodium sulfate and thiosulfate salts would also be retained. Of equal importance is that such macroporous adsorbent resins are capable of retaining the salts of anthraquinone disulfonic acid in a substantially quantitive manner so that more than 99% of the salts is recovered in the subsequent regeneration of the adsorbent resin packing.

Another advantage of the present process resides in that the regeneration of the adsorbent resin packing is relatively simple and it can be substantially integrated into the remaining steps of the process. A substantially complete recovery of the anthraquinone disulfonic acid salts is attainable, for example, by regenerating the salts-loaded adsorbent resin by passing water therethrough.

The aqueous solution of anthraquinone disulfonic acid salts obtained in this regenerating step is suitably admixed with the primary stream of the scrubbing liquid and recycled into the scrubbing stage. The amount of the water utilized for the regeneration of the packing is less than or equal to the amount of the side stream of the scrubbing liquid which had previously been passed through the adsorbent resin packing until the breakthrough of the adsorbent front formed by the adsorbed salts of anthraquinone disulfonic acid. Such a quantity of water is sufficient for the substantially quantitative regeneration of the adsorbent resin. To eliminate the necessity of supplying excess water, it is advantageous to use in the regeneration of the packed adsorption column substantially that amount of water which is equal to the quantity of the branched-off side scrubbing liquid stream.

In accordance with an additional feature of the invention, the partial side stream of the scrubbing liquid is introduced, after passing through the adsorbent resin packing wherein the salts of anthraquinone disulfonic acid are removed, into a combustion unit (as is done in the process of the aforementioned DOS No. 2,364,267 wherein the side stream of the scrubbing liquid is also burned, but of course, without the pretreatment in the adsorption column as provided in the present invention). Moreover, as opposed to the process of German DOS No. 2,364,267 wherein the high-temperature hydrolysis in the combustion unit is conducted only to form sodium sulfate, in another preferred embodiment of this invention, a fuel gas containing carbon monoxide or components reacting to form carbon monoxide is utilized in the combustion unit wherein reducing conditions are maintained to convert to carbonates the undesirable thiosulfate and sulfate contaminants, thereby ultimately producing an aqueous sodium carbonate solution. This aqueous sodium carbonate solution remaining after the combustion may then be used for the regeneration of the adsorbent resin packing, and the resultant solution is subsequently recombined with the primary stream of the scrubbing liquid. (This sodium carbonate solution-forming step is a useful improvement per se in the Stretford process even without the ADA salt removal step).

The gaseous hydrogen sulfide liberated during the combustion step can also be suitably recycled into the feed gas or gaseous feed mixture to be treated in the Stretford process as is also disclosed in the process of the German DOS No. 2,364,267. In this process variant, the separation of the salts of anthraquinone disulfonic acid from the branched-off side stream of the scrubbing liquid, the recovery of these salts, and the elimination of the undesirable by-products of the reaction are all integrated to a maximum degree into the overall scheme of the process.

In both embodiments of the present process (i.e. wherein the adsorption column is regenerated with: (1) water; or (2) the aqueous solution of sodium carbonate), at least two adsorption columns are used. When one of these columns is on the adsorption cycle, the other column is on the regeneration cycle. In both embodiments the column on the adsorption cycle is operated in that cycle until the breakthrough of the adsorbent front formed by the adsorbed salts of anthraquinone disulfonic acid. Subsequently, that column is switched to the regeneration cycle and the column previously on the regeneration cycle is switched to the adsorption cycle, in a conventional manner. In the adsorption cycle the column is operated at a temperature of 0° to 80° C., preferably 15° to 50° C., independent of pressure. In the desorption cycle, the column is operated at 0° C. to 95° C., preferably 40° C. to 90° C.

In both embodiments, the side stream of the scrubbing liquid which is passed into the adsorption column, comprises, as a Stretford process scrubbing liquid usually does, as essential components in percent by weight, 0.01% to 1% preferably 0.1% to 0.4% sodium salts of ADA, 0% to 35%, preferably 5% to 15% of sodium sulfate, 0% to 60%, preferably 1% to 20% of sodium thiosulfate, 0% to 1%, preferably 0.1% to 0.5% of sodium vanadate.

BRIEF DESCRIPTION OF THE DRAWING

The FIGURE is a schematic flowsheet illustrating a preferred integrated embodiment of the process of this invention.

DETAILED DESCRIPTION OF THE DRAWING

A gaseous feed mixture to be freed of hydrogen sulfide is introduced through a conduit 1, combined with a recycle gas stream rich in hydrogen sulfide fed through a conduit 2, and conducted into a scrubbing (absorption) column 3. A scrubbing liquid, comprising an aqueous solution of sodium salt of anthraquinone disulfonic acid, made alkaline by the addition of sodium carbonate, and sodium vanadate is fed to the top of the scrubbing column through a conduit 4. The hydrogen sulfide from the gaseous mixture rising within the scrubbing column 3 is absorbed by the scrubbing liquid, which is in intimate contact with the feed gas, established, for example, by superimposed, wooden lattice gratings. The hydrogen sulfide-depleted gas is withdrawn via a conduit 5 from the top of the scrubbing column. The hydrogen sulfide dissolved in the scrubbing liquid is rapidly reacted with sodium carbonate to sodium hydrogen sulfide which is subsequently oxidized in a somewhat more gradually occurring reaction with sodium metavanadate to elemental sulfur. Sodium vanadate reduced in this reaction is reoxidized (i.e. oxidized to its original oxidation stage of $V^{5+}$) by sodium salt of anthraquinone disulfonic acid with the simultaneous reduction of the sodium salt of ADA. The formation of the sodium hydrogen sulfide takes place in the zone of the gas-liquid countercurrent contact whereas the remaining reactions take place in the liquid phase and continue to occur in the bottom of the scrubbing column and/or in a dwell tank, not shown, connected downstream of the bottom of the scrubbing column.

The bottom liquid, containing, inter alia, reduced sodium salt of anthraquinone disulfonic acid, and elemental sulfur in a suspended form, is discharged through a conduit 6 and introduced into an oxidation tank 7. Simultaneously, air is fed through conduit 8 to the tank 7 to reoxidize the reduced sodium salt of anthraquinone disulfonic acid. Excess oxygen and the atmospheric nitrogen are withdrawn through a conduit 9 from the oxidation tank. The elemental sulfur 10 accumulating on the surface level of the liquid in the oxidation tank 7 is continuously discharged through a conduit 11 and conducted to storage or to further processing. The thus-regenerated scrubbing liquid is withdrawn by a pump 12 from the bottom of the oxidation tank and pumped back to the top of the scrubbing column 3.

A side stream of the scrubbing liquid is continuously withdrawn through a conduit 13 to facilitate the removal of the undesirable by-product salts, e.g., sodium thiosulfate and sodium sulfate, formed in the liquid phase in unavoidable secondary reactions, these by-products having to be limited in the circulating scrubbing liquid to a concentration of normally about 20% by weight. This side stream comprises, in percent by weight, about 0.3% of the sodium salt of anthraquinone disulfonic acid, about 13.4% of sodium sulfate, about 1.7% of sodium thiosulfate, about 0.3% of sodium carbonate, about 0.3% sodium vanadate, about 2.0% sodium hydrogen carbonate, about 0.4% sodium tartrate and the remainder being water. The side stream is fed to an adsorption plant consisting of two reversible adsorption columns 14, 15. The side stream is fed to the column 14, which is in the adsorption cycle at 35° C., and atmospheric pressure, through a valve 27. Valves 26 and 29 are closed at this time. The adsorption columns are filled with a macroporous adsorbent resin on the basis of polystyrene/divenylbenzene, the pore diameter being 25–50 angstroms, which preferentially adsorbs the sodium salt of anthraquinone disulfonic acid. The packing does not adsorb the undesired by-products, e.g., sodium thiosulfates and sodium sulfates. Therefore, these by-products pass substantially quantitatively through a valve 22 and a conduit 17 into a combustion chamber 16, wherein they are burned with a fuel gas rich in carbon monoxide fed to the combustion chamber to produce sodium carbonate. The fuel gas (comprising 22.3% by volume carbon monoxide, 27% methane, 34% hydrogen, 9.5% carbon dioxide, 4% nitrogen and 3.2% lower hydrocarbons) is introduced through a conduit 18. Gaseous hydrogen sulfide, another product of the combustion, is withdrawn through a conduit 19 and is combined through a conduit 2 with the gaseous feed mixture. By operating the process in this manner, substantially all of the sulfur present in the feed hydrogen sulfide is recovered substantially quantitatively in elemental form.

The liquid resulting from the combustion comprises an aqueous solution of sodium carbonate having the following composition: 7.3% by weight sodium carbonate, 2.9% sodium hydrogen sulfide, 1.3% sodium sulfate, 0.4% sodium hydrogen carbonate, 0.3% sodium vanadate, the remainder being water. This liquid (obtained as a result of the combustion of the sodium sulfate and the sodium thiosulfate) passes through a conduit 20 and an open valve 25 into the adsorption column 15, which is in the regeneration cycle. In this adsorption column, the liquid desorbs the sodium salt of anthraquinone disulfonic acid from the packing and is thereafter recombined with the primary stream of the scrubbing liquid through a valve 28 and a conduit 21, and returned to the top of the scrubbing column 3. The valves 24 and 29 are closed during the desorption cycle of the bed 15. The liquid leaving the adsorption plant through the conduit 21 has approximately the composition of that mentioned above resulting from the combustion, with the addition of 0.3% by weight of the sodium salt of anthraquinone disulfonic acid.

The scrubbing liquid fed to the top of the scrubbing column 3 through the conduit 4 has approximately the composition of the side stream withdrawn through conduit 13. The volume relationship between the scrubbing liquid circulated by pump 12 and the side stream withdrawn through conduit 13 is 50,000 m$^3$/h to 15 m$^3$/h.

According to the above-described integrated embodiment the adsorption columns are regenerated with the liquid resulting from the combustion.

As already mentioned it is also possible to perform the regeneration step by means of water. In this case the side stream may for example have the following composition: 14.7% by weight of sodium sulfate, 2.0% of sodium thiosulfate, 2.2% of sodium hydrogen carbonate, 0.4% of sodium carbonate, 0.3% of the sodium salt of anthraquinone disulfonic acid, 0.1% of sodium vanadate, 0.1% of sodium thiocyanate and 0.2% of methanol, the remainder being water.

15 m$^3$/h of this side stream are fed through conduit 13 to the adsorber in the adsorption phase, only the salt of anthraquinone disulfonic acid being retained therein, nearly quantitatively. The adsorption temperature is 38° C. After switching to the desorption phase 11.5 m$^3$/h of water at a temperature of about 75° C. are introduced for regeneration purposes, entraining the desorbing salt of anthraquinone disulfonic acid nearly quantitatively. The adsorbers are filled with 3 m$^3$ each of macroporous adsorption resin on a polystyrene/divenylbenzene basis. Adsorption and regeneration pressures are 1 bar.

In this case the liquid leaving the adsorber in the adsorption phase is burnt in the combustion stage and directly recycled into the scrubbing liquid conduit 4.

The efficiency of the macroporous adsorbent resins with regard to the separation of the anthraquinone disulfonic acid salts can be illustrated on a laboratory scale. For example, when a scrubbing liquid of the aforementioned composition is passed through a laboratory column charged with 500 ml. of the macroporous adsorbent resin on a polystyrene basis, the scrubbing liquid volume passed through the column before the breakthrough of the anthraquinone disulfonic acid salt is about 3500 ml. The liquid leaving the column has only less than 0.01% by weight of the sodium salt of anthraquinone disulfonic acid with all of the other components remaining the same as in the feed stream. The remaining components of the scrubbing liquid pass through the packing in a substantially quantitative fashion. If the packing is then regenerated counter-currently with 3500 ml. of water having a temperature of 25° C., more than 99% of the initially adsorbed anthraquinone disulfonic acid salt is thereby recovered.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the treatment of hydrogen sulfide-containing feed gas stream comprising passing the feed gas stream through an absorber wherein the hydrogen sulfide is absorbed into a scrubbing liquid containing a salt of anthraquinone disulfonic acid in alkaline solution, regenerating the scrubbing liquid by passing air therethrough, and subsequently branching off a side stream from the regenerated scrubbing liquid to prevent a deleterious build-up of contaminants formed as by-products, the improvement comprising passing the side stream through an adsorption column packed with a macroporous resin to selectively remove the alkaline salts of anthraquinone disulfonic acid from the side stream.

2. A process according to claim 1, wherein the adsorption column is filled with macroporous adsorbent resin on a polystyrene, polymethylacrylate or polymethylmethacrylate basis.

3. A process according to claim 1, wherein in the adsorption cycle of the adsorption column, the side stream of the adsorption liquid is passed through the adsorption column until the breakthrough of the anthraquinone disulfonic acid salts.

4. A process according to claim 3, wherein in the regeneration cycle of the adsorption column, the alkaline anthraquinone disulfonic acid salts-loaded adsorbent resin is regenerated by passing water therethrough, thereby producing an aqueous solution of the alkaline anthraquinone disulfonic acid salts, and wherein the aqueous solution is subsequently combined with the scrubbing liquid.

5. A process according to claim 4 wherein the quantity of the water used in the regeneration cycle of the adsorption column is less than or equal to the quantity of the side stream of the scrubbing liquid used in the adsorption cycle of the adsorption column.

6. A process according to claim 1 wherein the contaminants comprise sodium thiosulfate and sodium sulfate.

7. A process according to claim 6 wherein the side stream, after passing through the adsorption column is passed to a combustion unit to decompose said sodium thiosulfate and precipitate out sodium sulfate.

8. A process according to claim 6, wherein the side stream, after passing through the adsorption column is passed to a combustion unit wherein the side stream is reacted with carbon monoxide, thereby reacting the sodium thiosulfate and the sodium sulfate to sodium carbonate, and simultaneously producing gaseous hydrogen sulfide.

9. The process of claim 8, further comprising forming an aqueous solution of said sodium carbonate, and employing the aqueous solution of sodium carbonate in the regeneration cycle of the adsorption column to regenerate the macroporous resin, thereby producing an aqueous solution of the alkaline salts of anthraquinone disulfonic acid, and subsequently combining the aqueous solution of the alkaline salts of anthraquinone disulfonic acid with the absorbing liquid.

* * * * *